United States Patent [19]
Komarek
[11] 4,097,215
[45] Jun. 27, 1978

[54] SEGMENTED BRIQUETTING ROLL

[75] Inventor: Karl R. Komarek, Chicago, Ill.
[73] Assignee: K. R. Komarek, Inc., Elk Grove Village, Ill.

[21] Appl. No.: 796,233
[22] Filed: May 12, 1977
[51] Int. Cl.[2] .......... B29C 1/00; B29C 3/02
[52] U.S. Cl. .......... 425/471; 425/237
[58] Field of Search .......... 425/237, 470, 471; 29/110

[56] References Cited

U.S. PATENT DOCUMENTS

| | | | |
|---|---|---|---|
| 538,475 | 4/1895 | Albrecht | 425/107 |
| 661,617 | 11/1900 | McCanna | 29/124 X |
| 915,332 | 3/1909 | Barnes | 425/195 |
| 1,232,764 | 7/1917 | Brundage | 425/237 |
| 2,294,098 | 8/1942 | Stromer | 83/12 |
| 2,455,980 | 12/1948 | Dallas et al. | 425/470 |
| 2,798,676 | 7/1957 | Heer | 29/123 X |
| 2,945,259 | 7/1960 | Decker et al. | 425/195 |
| 2,958,902 | 11/1960 | Decker et al. | 425/195 |
| 2,958,903 | 11/1960 | Decker | 425/237 X |
| 3,077,634 | 2/1963 | Komarek et al. | 425/237 |
| 3,302,592 | 2/1967 | Werner | 425/471 |
| 3,829,267 | 8/1974 | Woodward | 425/237 |
| 3,830,612 | 8/1974 | Komarek | 425/194 |
| 3,873,259 | 3/1975 | Kennedy | 425/470 |
| 3,969,062 | 7/1976 | Komarek | 425/471 |

*Primary Examiner*—Robert L. Spicer, Jr.
*Attorney, Agent, or Firm*—Finnegan, Henderson, Farabow & Garrett

[57] ABSTRACT

A briquetting press roll comprising a cylindrical core having a regular polygonal cross-section and a plurality of equal planar sections around its peripheral surface, each planar section having at least one transverse groove. Secured end-to-end around the peripheral surface of the core are a plurality of removable mold segments, each having a flat bottom surface coterminous with one of the planar sections and an arcuate top working surface, forming a right circular cylinder. The flat bottom surface of each mold segment has at least one transverse groove substantially complementing the transverse groove in the coterminous planar section to form a keyway. Devices for securing the segments to the core and for utilizing the keyways to align and prevent movement of the segments relative to the core peripheral surface are provided.

8 Claims, 6 Drawing Figures

Fig. 1
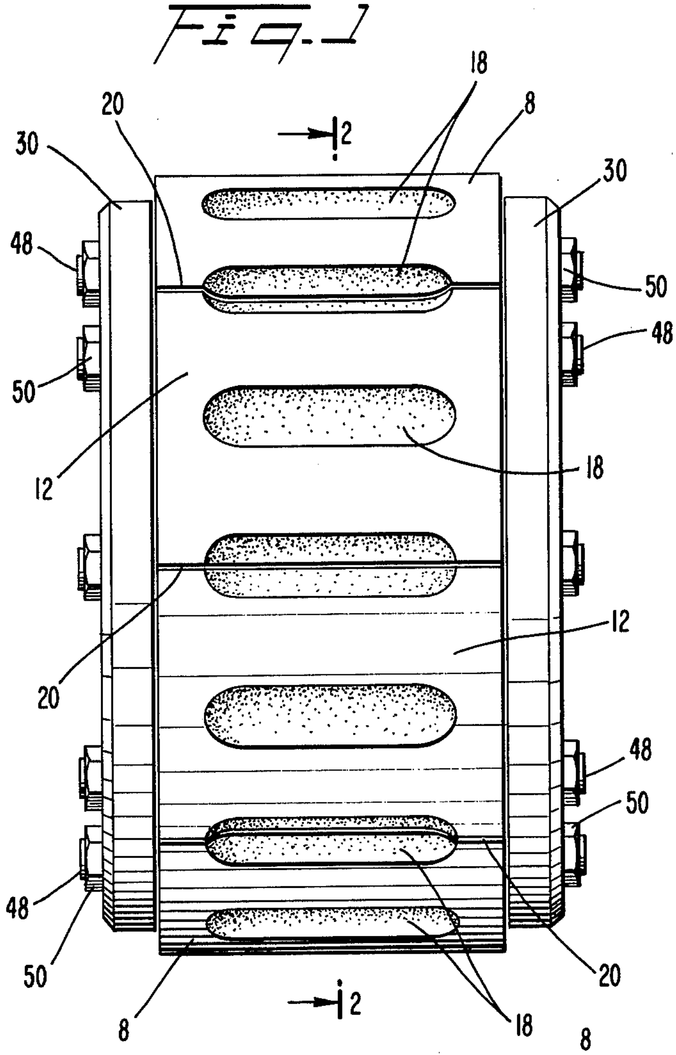
Fig. 2
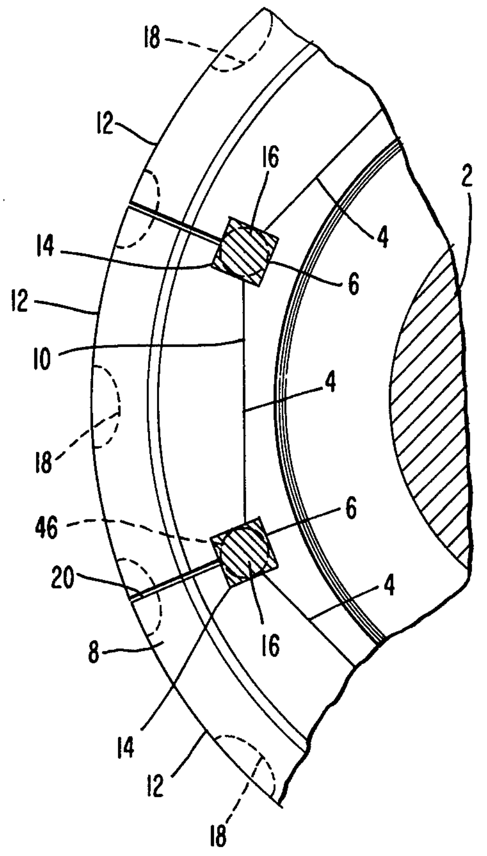
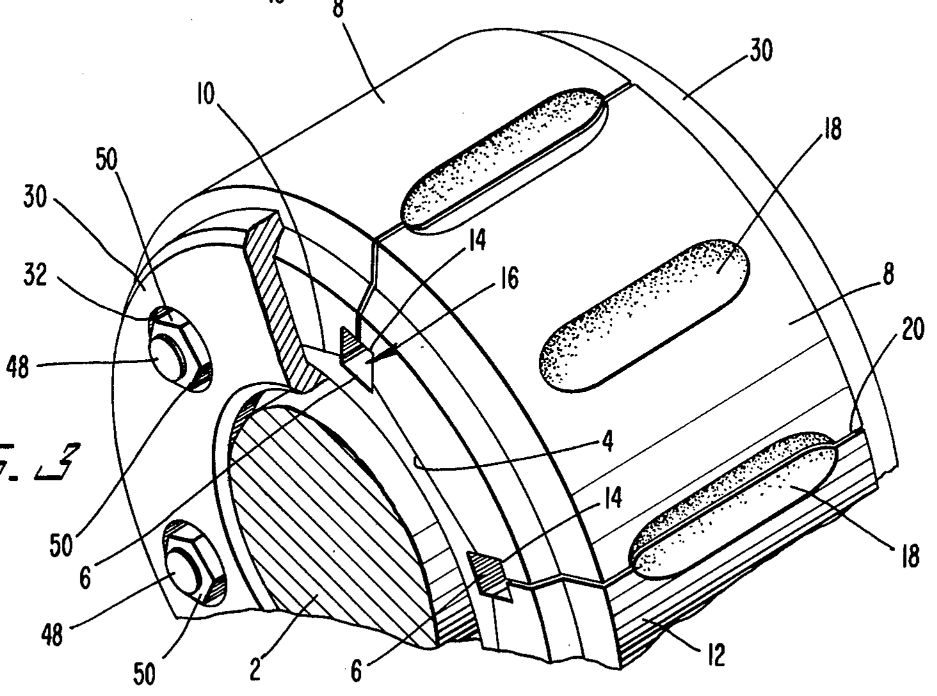
Fig. 3

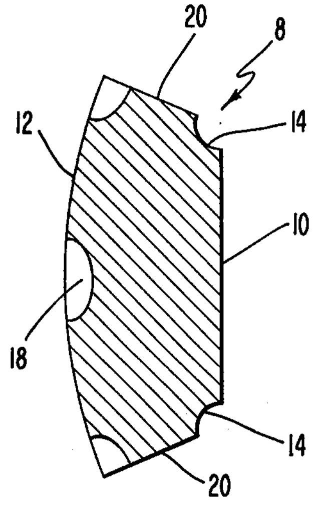
Fig. 6
Fig. 4
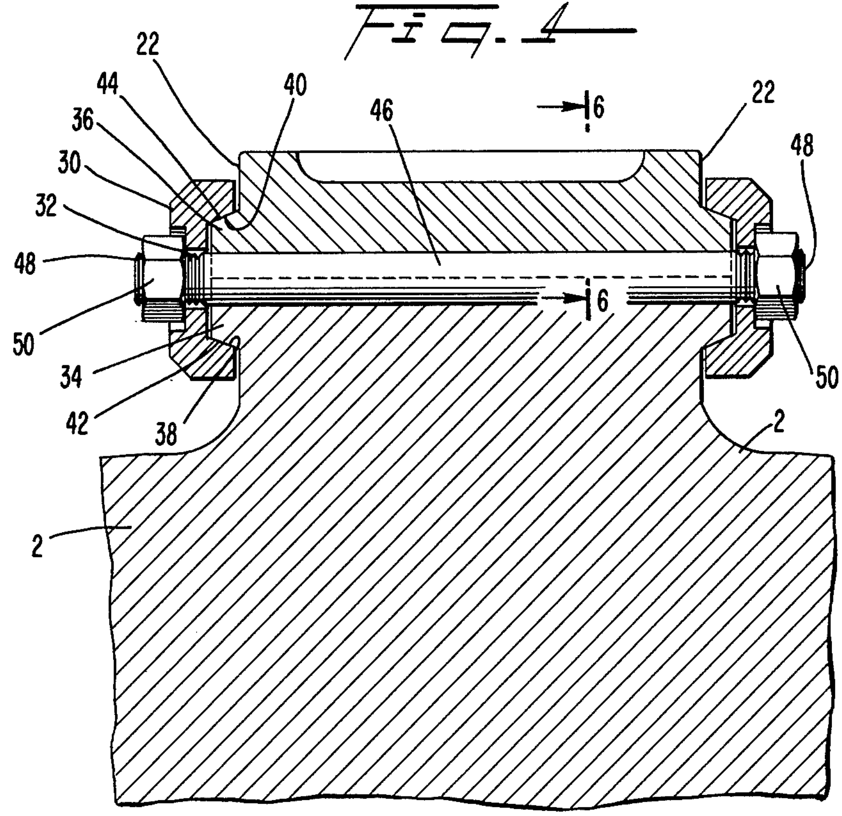
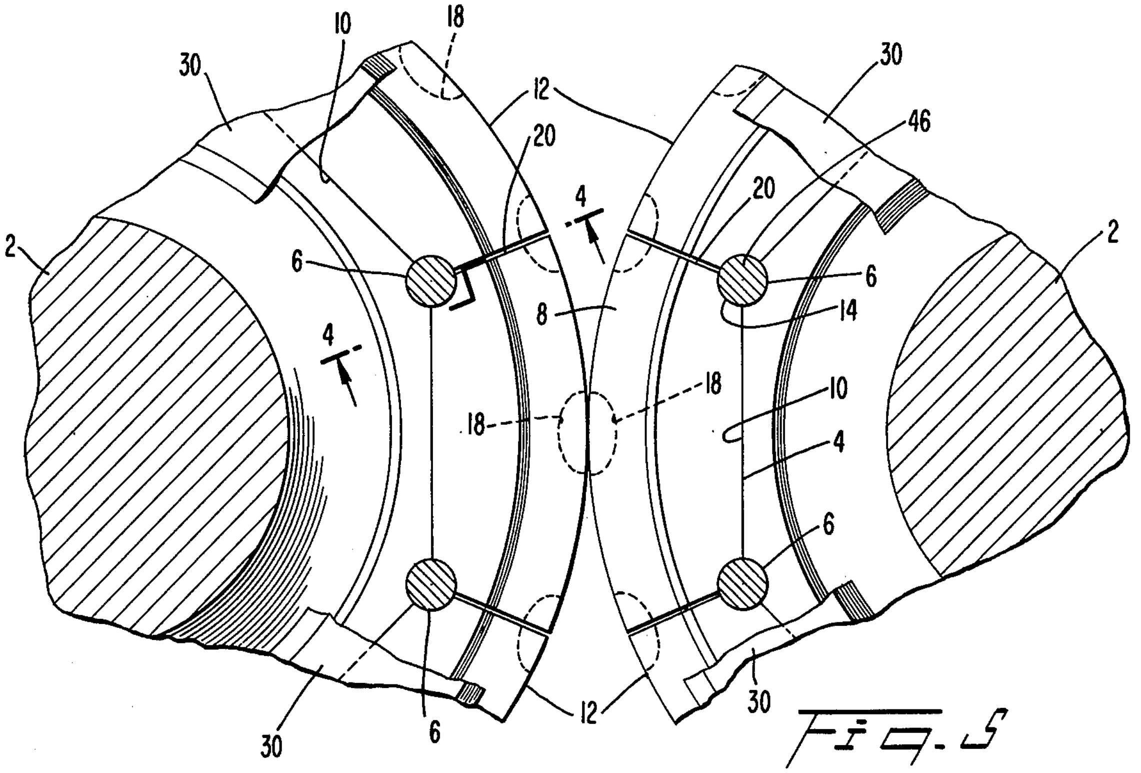
Fig. 5

SEGMENTED BRIQUETTING ROLL

BACKGROUND OF THE INVENTION

1. Field of the Invention

This invention relates to briquetting press rolls having removable mold segments secured around the periphery of the roll core.

2. Description of the Prior Art

Briquetting of various types of materials such as charcoal and the like has been done for many years. Briquetting roller presses employing two cooperating rollers, geared together for mutually correlated rotation, are well known. The use of roller wheels comprising a number of replaceable mold segments having surfaces provided with mold cavities for receiving the material to be briquetted is also well known.

In recent years, briquetting techniques have been extended to include briquetting of such materials as iron ore and particulate metals. Briquetting of such materials requires the use of high pressure and often high temperature. High pressure between briquetting rolls and the maintenance of high pressure at elevated temperatures, as well as the abrasive nature of many materials, cause increased wear on the briquetting rolls. Such increased wear necessitates more frequent replacement of worn-out or broken mold segments.

The need for more frequent replacement of mold segments makes desirable briquetting rolls in which worn-out mold segments may be removed and replaced readily. However, to retain proper alignment of the mold cavities in cooperating rolls, it is important that the mold segments be rigidly attached to the briquetting roll core during briquetting operations. Desirably, mold segments are readily replaceable while being constrained from moving relative to the briquetting roll core periphery. The mold segments must be restrained from rotational movement about the circumference of the briquetting roll core and from movement in an axial direction relative to the briquetting roll core.

As previously noted, the use of briquetting rolls consisting of a multiplicity of mold segments has long been known in the art. For example, U.S. Pat. No 538,475, issued in 1895, discloses a briquetting roll design comprising a plurality of mold segments. Similarly, U.S. Pat. No. 915,332, issued in 1909, discloses a briquetting roll design which comprises, in effect, a continuous ring divided into a number of sections which are restrained from rotation relative to the roll shaft by set screws.

Many briquetting roll designs are intended to provide a structure, using conventional materials of construction, in which the mold segments can be changed or replaced more readily than a solid roll. For example, Decker, U.S. Pat. No. 2,945,259 discloses segments of cast iron or steel which are bolted to the periphery of the shaft.

More recently, I have invented briquetting rolls comprising mold segments that are secured around the periphery of a roll core as exemplified in U.S. Pat. Nos. 3,077,634, 3,830,612 and 3,969,062. Each of my previous briquetting roll designs includes rather complicated designs or mechanisms to restrain movement of the mold segments relative to the roll core. It is desirable to reduce the manufacturing expense and the likelihood of flaws induced by the manufacturing process, as well as the number of sharp corners, flanges, protrusions, etc. that are subject to premature failure. Additionally, the more complicated manufacturing processes involved are extremely difficult or even impossible when constructing mold segments and roll cores of the more exotic alloys and materials necessary for use with high pressures and temperatures.

The present invention provides a briquetting roll in which the mold segments easily may be replaced. However, while this is a desirable feature of the design, it is not the only, or even the fundamental advantage of the design. The design of the present invention provides a roll core and mold segments which can be easily manufactured and which minimizes the number of potential weak spots. This design makes possible the use of materials of construction that are too hard, too difficult or too costly to fabricate into solid rolls or into segmented rolls incorporating involved design structures to prevent relative motion of the segments with respect to the core. Additionally, the present design provides a roll structure which is suitable for use at high temperatures and pressures and provides a means for supporting the mold segments in such a manner that breakage is reduced.

SUMMARY OF THE INVENTION

In accordance with the invention, the briquetting roll comprises a substantially cylindrical central core, each lateral cross-section of which being a substantially regular polygon forming a plurality of substantially equal planar sections around the peripheral surface of the core, each of the planar sections having at least one transverse groove. Secured end-to-end around the peripheral surface of the core are a plurality of removable mold segments each having a flat bottom surface coterminous with one of the planar sections and an arcuate top working surface forming a right circular cylinder. The flat bottom of each of the mold segments has at least one transverse groove which is substantially complementary to the transverse groove in the coterminous planar section of the core surface forming a keyway. Devices are provided for securing the segments to the core and for utilizing the keyways to align, and prevent movement of, the segments relative to the peripheral surface of the core.

Preferably, each mold segment has two opposite end walls and two opposite side walls connecting the top working surface to the bottom surface. Two annular retaining rings, one on each side of the central core, span the interface between the mold segments and the periphery of the central core to secure the mold segments to the central core, the retaining rings having a plurality of spaced, centrally located holes being coaxial with the keyways. Each retaining ring engages an annular flange axially extending from each side of the core proximate its periphery and a flange axially extending from each side wall of each mold segment proximate its bottom surface.

It is also preferably that the transverse grooves in the periphery of the core be located substantially along the junctions of the planar surfaces forming the core periphery and that the bottom surface of each mold segment have two transverse grooves, one located on each junction of the bottom surface and one of the end walls such that one groove in the peripheral surface of the core and one groove in each of the abutting segments cooperate to form one of the keyways.

Preferably the means for affixing the mold segments to the periphery of the core includes a plurality of bolts and nuts, a bolt passing through each of the keyways and through the coaxial holes in the retaining rings such that tightening the nuts on the bolt will draw the retaining rings together and secure the mold segments to the core.

The invention provides a segmented briquetting roll of a simplified design in which the mold segments are secured to the peripheral surface of the roll core and are prevented from moving axially or radially with respect to the roll core surface.

The significance of the invention is the simplicity of the design of the roll core surface and the mold segments making possible construction out of metals previously considered too difficult or too expensive to manufacture into the more complicated designs of the prior art.

Additional advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

The accompanying drawings, which are incorporated in and constitute a part of the specification, illustrate one embodiment of the invention and, together with the description, serve to explain the principles of the invention.

BRIEF DESCRIPTION OF THE DRAWINGS

FIG. 1 is an end view of the briquetting roll of this invention comprising a central core, retaining rings and mold segments.

FIG. 2 is a fragmented side view of the briquetting roll in FIG. 1 with the retaining ring removed illustrating one embodiment of the invention.

FIG. 3 is a fragmented perspective view of an entire briquetting roll employing one embodiment of the present invention.

FIG. 4 is a cross section of one embodiment of the present invention, illustrating the configuration of a mold segment, roll core periphery and retaining rings.

FIG. 5 is a fragmented side view of two cooperating briquetting rolls shown without the annular retaining rings, illustrating another embodiment of the present invention.

FIG. 6 is a cross sectional view of one mold segment of one embodiment of the present invention.

DESCRIPTION OF THE PREFERRED EMBODIMENT

In accordance with the invention and as seen in FIGS. 1, 2 and 3, the briquetting roll comprises a substantially cylindrical central core 2 having a substantially regular polygonal cross section forming a plurality of substantially equal planar sections 4 around the peripheral surface of the core 2. Each of the planar sections 4 has at least one transverse groove 6.

As herein embodied, the transverse grooves 6 in the periphery of the central core 2 are located substantially along the junctions of the planar surfaces 4 forming the core periphery.

In accordance with the invention, as seen in FIGS. 2, 3, 5 and 6, a plurality of end-to-end, removable mold segments 8 are located around the peripheral surface of the core 2. Each of the segments 8 has a flat bottom surface 10 (FIGS. 2 and 6) that is coterminous with one of the planar sections 4 of the periphery of the core 2. Each segment 8 has, opposite the flat bottom surface 10, an arcuate top working surface 12 which, in conjunction with other mold segments 8 located around the periphery of the central core 2, form a right circular cylinder. Each of the bottom surfaces 10 of the mold segments 8 has at least one transverse groove 14 which substantially complements the transverse grooves 6 in the coterminous planar sections 4 of the surface of the core 2, forming a keyway 16.

More particularly, and as best seen in FIG. 6, the mold segments 8 comprise an arcuate top working surface 12 into which is formed one or more mold cavities 18; a flat bottom surface 10 opposite the top working surface 12 which, when the mold segment 8 is secured to the periphery of the core 2, is in substantial contact and substantially coterminous with one of the planar surfaces 4 of the core periphery; two opposite end walls 20 connecting the top working surface 12 and the bottom surface 10, the end walls diverging with respect to each other relative to the bottom surface 10; and two opposite side walls 22 connecting the top working surface 12 with the bottom working surface 10. Preferably, each mold segment 8 includes two transverse grooves 14, one located at each intersection of the flat bottom surface 10 and one end wall 20. The transverse grooves 14 complement the transverse grooves 6 located in the peripheral surface of the core 2 at the junctions of the planar sections 4 such that one groove 6 of the peripheral surface of the core 2 and one groove 14 in each of abutting segments 8 cooperate to form one of the keyways 16.

Preferably, the transverse grooves 6 and 14 have such a shape that the cross section of the keyway 16 is square. It may also be preferred that the cross section of the keyway 16 be circular.

In accordance with the invention, means are provided for securing the segments to the core and for utilizing the keyways to align and prevent movement of the segments relative to the peripheral surface of the core.

As herein embodied, and as best seen in FIGS. 3 and 4, the means for securing the segments to the core comprise two annular retaining rings 30, one on each side of the central core 2, each spanning the interface between the mold segments 8 and the periphery of the central core 2 to secure the mold segments to the central core. The retaining rings 30 include a plurality of spaced, centrally located holes 32 being substantially coaxial with the keyways 16.

Means are provided on each side of said core 2 proximate its periphery and on each side wall 22 of each of the mold segments 8 proximate its bottom surface 10 for detachably connecting the retaining rings. The retaining rings 30 are held in place by affixing means passing through the retaining ring holes 32 and the keyways 16 for drawing the retaining rings 30 together, thereby securely attaching the mold segments 8 to the central core 2 and aligning and preventing movement of the mold segments 8 relative to the periphery of the central core 2.

Preferably, the retaining ring connecting means comprises an annular flange 34 axially extending outward from each side of the core 2 and a complementary flange 36 projecting from each side wall 22 of each segment 8. Outwardly facing surfaces 38 and 40 of the flanges 34 and 36 are at an angle to the axis of rotation of the core 2 and converge toward the retaining ring 30 with respect to each other. It is also preferable that the retaining ring 30 include opposed, tapered surfaces 42 and 44 for engaging the angled surfaces 38 and 40 of the core annular flange 34 and the segment flanges 36.

Preferably, the affixing means comprises a bolt 46 passing through the holes 32 in the retaining ring 30 and through the keyway 16. The cross section of the bolt 46 conforms to the cross section of the keyway 16, except for the threaded portion 48 when the cross section is square. The retaining rings 30 are drawn together by tightening nuts 50 on the threaded portions 48 of the bolt 46 to secure the mold segments 8 to the core 2.

The bolts 46 passing through the keyways 16 serve as means of preventing movement of the segments 8 with respect to the peripheral surface of the core 2. The cooperation of the tapered annular flanges 34 and 36 and the angled surfaces 42 and 44 of the retaining rings 30, when the flanges are drawn together by tightening the nuts 50 on the bolts 36, serve to secure the mold segments 8 to the peripheral surface of the core 2.

As the mold segments 8 become worn or broken through use, they are easily removable and replaceable by merely loosening one or both of the nuts 50 on the bolts 46 to loosen the annular retaining rings 30.

The present invention is not limited to the specific embodiment illustrated and described. Departures may be made from the described embodiment without departing from the principles of the invention, and without sacrificing its chief advantages.

What is claimed is:

1. A briquetting roll, comprising:

(a) a central core having two sides and being a substantially radially symmetrical polygonal prism having a diameter greater than its length and being adapted for rotation about its axis;

(b) each planar surface of the periphery of said polygonal core having at least one transverse groove;

(c) a plurality of end-to-end removable mold segments around the periphery of said core, each of said mold segments comprising:

(1) an arcuate top working surface;

(2) a flat bottom surface opposite said working surface being in substantial contact and substantially coterminous with one of the planar surfaces of the periphery of said core, said bottom surface having at least one transverse groove substantially complementing one of said grooves in the coterminous planar surface of said core to form a transverse keyway;

(3) two opposite end walls connecting said top working surface and said bottom surface, said end walls diverging with respect to each other relative to said bottom surface; and (4) two opposite side walls connecting said top working surface and said bottom surface;

(d) two annular retaining rings, one on each side of said central core, each spanning the interface between said mold segments and the periphery of said central core to secure said mold segments to said central core, said retaining rings having a plurality of spaced, centrally located holes coaxial with said keyways;

(e) means on each side of said core proximate its periphery and on each side wall of each of said mold segments proximate its bottom surface for detachably connecting said retaining ring; and (f) affixing means passing through said retaining ring holes and said keyways for drawing said two annular retaining rings together to effect secure attachment of said mold segments to said central core and for aligning and preventing movement of said mold segments relative to the periphery of said central core.

2. The briquetting roll as in claim 1 wherein the transverse grooves in the periphery of said core are located substantially along the junctions of the planar surfaces forming said core periphery.

3. The briquetting roll as in claim 2 wherein each of said mold segments has two transverse grooves, one located along each junction of the bottom surface and one of the end walls such that one groove in the peripheral surface of the core and one groove in each of abutting segments cooperate to form one of said keyways.

4. The briquetting roll as in claim 1 wherein said retaining ring connecting means comprises an annular flange extending axially outward from each side of said core and a complementary flange projecting from each side wall of each segment, outwardly facing surfaces of said flanges being at an angle to the axis of rotation and convergent toward the retaining ring with respect to each other.

5. The briquetting roll as in claim 4 wherein said affixing means passing through the holes in said retaining rings and said keyways are bolts and nuts for drawing said retaining rings together.

6. The briquetting roll as in claim 5 wherein each said retaining rings include opposed, tapered surfaces for engaging the angled surfaces of said core annular flange and said segment flanges such that tightening said bolts and nuts securely affixes said segments to said core.

7. The briquetting roll as in claim 5 wherein the holes in said retaining rings and the cross sections of said keyways are round and wherein the shafts of said bolts are correspondingly round.

8. The briquetting roll as in claim 5 wherein the holes in said retaining rings and the cross sections of said keyways are square and wherein the shafts of said bolts, except for the threaded portion, are correspondingly square.

* * * * *